June 26, 1962 — O. THOMA ETAL — 3,040,532
HYDRAULIC APPARATUS

Filed Sept. 7, 1961 — 4 Sheets-Sheet 1

INVENTORS
OSWALD THOMA &
ERIC H. BOWERS
BY
Reynolds + Christman
ATTORNEY

June 26, 1962  O. THOMA ETAL  3,040,532
HYDRAULIC APPARATUS
Filed Sept. 7, 1961  4 Sheets-Sheet 2

INVENTORS
OSWALD THOMA +
ERIC H. BOWERS
BY Reynolds + Christensen
ATTORNEYS

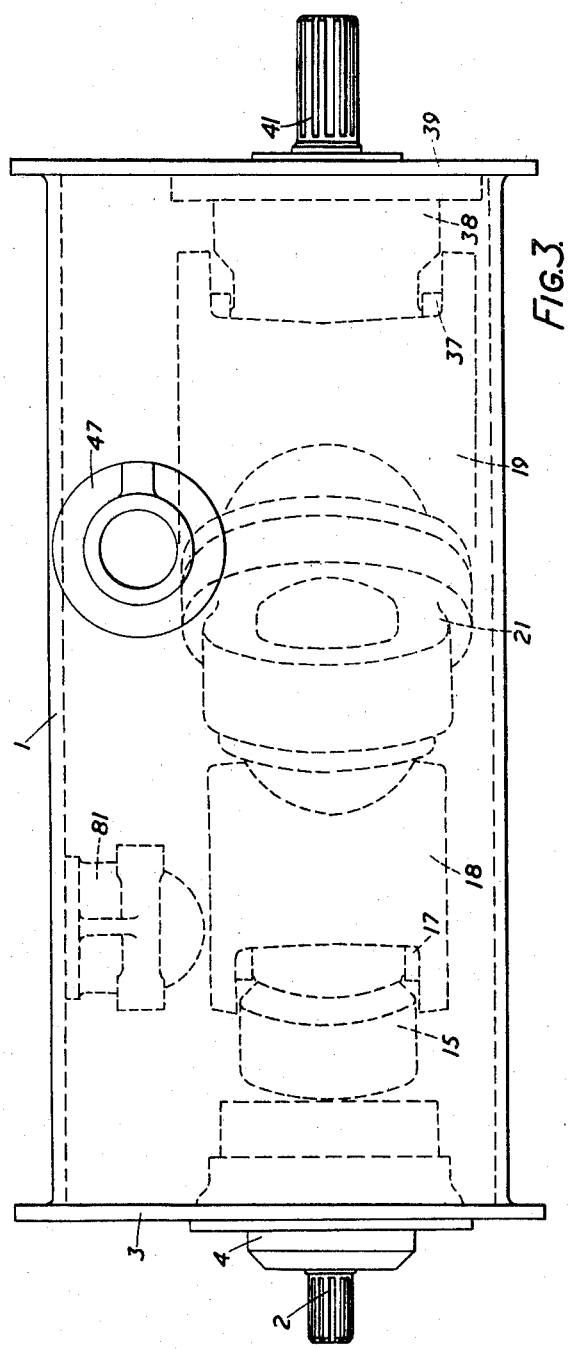

United States Patent Office 3,040,532
Patented June 26, 1962

3,040,532
HYDRAULIC APPARATUS
Oswald Thoma, Charlton Kings, and Eric H. Bowers, Cheltenham, England, assignors to Dowty Hydraulic Units Limited, Tewkesbury, England, and Unipat A.G., Glarus, Switzerland, a Swiss company
Filed Sept. 7, 1961, Ser. No. 136,513
Claims priority, application Great Britain Sept. 12, 1960
15 Claims. (Cl. 60—53)

This invention relates to hydraulic apparatus and more particularly to power transmission of the kind having a variable positive displacement hydraulic pump and a variable positive displacement hydraulic motor, hydraulically interconnected one with the other so that mechanical power supplied to drive the pump is delivered as mechanical power from the motor, the speed ratio of the transmission which comprises the ratio of motor speed to pump speed being determined by the relative displacements of the pump and motor. Such a transmission will be referred to as a transmission of the kind referred to.

The present invention comprises a transmission of the kind referred to wherein the pump and motor each comprise a rotary cylinder block having cylinders parallel or nearly parallel to the rotation axis, a rotary thrust plate having a drive shaft fixedly secured thereto and arranged to rotate about an axis variably inclined to the axis of cylinder block rotation to cause reciprocation of pistons in the cylinders, and wherein the cylinder blocks of pump and motor are rotatably carried by a movable cylinder block carrier which is controllably movable for simultaneous adjustment of the inclinations of the thrust plates to their respective cylinder blocks, to give a desired adjustment of speed ratio. The movement of the block carrier may be a pivotal movement adjusting the displacements of pump and motor oppositely. Preferably, such pivotal movement should take place about a pivotal connection co-axial with the pivotal axis about which the pump or motor cylinder block is movable relatively to its associated thrust plate, whereby the drive shaft to that thrust plate can be mounted in fixed bearings for rotation about its own axis. The drive shaft to the other thrust plate is then necessarily carried by movable bearings arranged to move in accordance with movement of the block carrier. Preferably the said drive shaft to the other thrust plate is pivoted at a predetermined position by means of a universal joint, bevel gear drive, or other mechanical means whereby rotational power may be transmitted, the predetermined position being such that unequal angular movements of the thrust plates relatively to their cylinder blocks are obtained for any angular movement of the block carrier.

Where the transmission of the invention is used for the transmission of power from a vehicle engine to the vehicle driving wheels it is usual that engine power is transmitted at reduced speed and increased torque to the driving wheels and for this purpose it is desirable that the maximum displacement of the motor should be greater than the maximum displacement of the pump. In this arrangement it is then preferred that the pivotal axis of the block carrier should coincide with the pivotal axis about which the cylinder block is moved relatively to the thrust plate, the drive shaft of the motor thrust plate then being located in fixed bearings. It then follows that the pump drive should be effected through a universal joint or equivalent device to drive the pump thrust plate. It is preferred that the space in between the universal joint and the pump thrust plate pivot axis should be smaller than the space between the pump thrust plate pivot axis and the motor thrust plate pivot axis so that during pivotal movement of the block carrier, the pump will change its displacement proportionally at a greater rate than the proportional change in pump displacement, in order that the pump displacement may be moved from a reverse value to a full positive value during adjustment of the motor from a full positive displacement to a smaller positive displacement.

It is preferred that the whole transmission including the universal joint in the pump drive shaft should be mounted within a reservoir containing hydraulic liquid and that such reservoir may conveniently form a structural member of the vehicle when the transmission is used for vehicle propulsion. Also there may be mounted within the reservoir a make-up pump driven by the input shaft to the transmission whose function is to maintain the transmission primed with liquid.

A servo motor may be mounted within the reservoir to effect controlled movement of the block carrier.

One example of the invention will now be described with reference to the accompanying diagrammatic drawings in which:

FIGURE 3 is a plan of the transmission of FIGURE 1,

Figure 1:
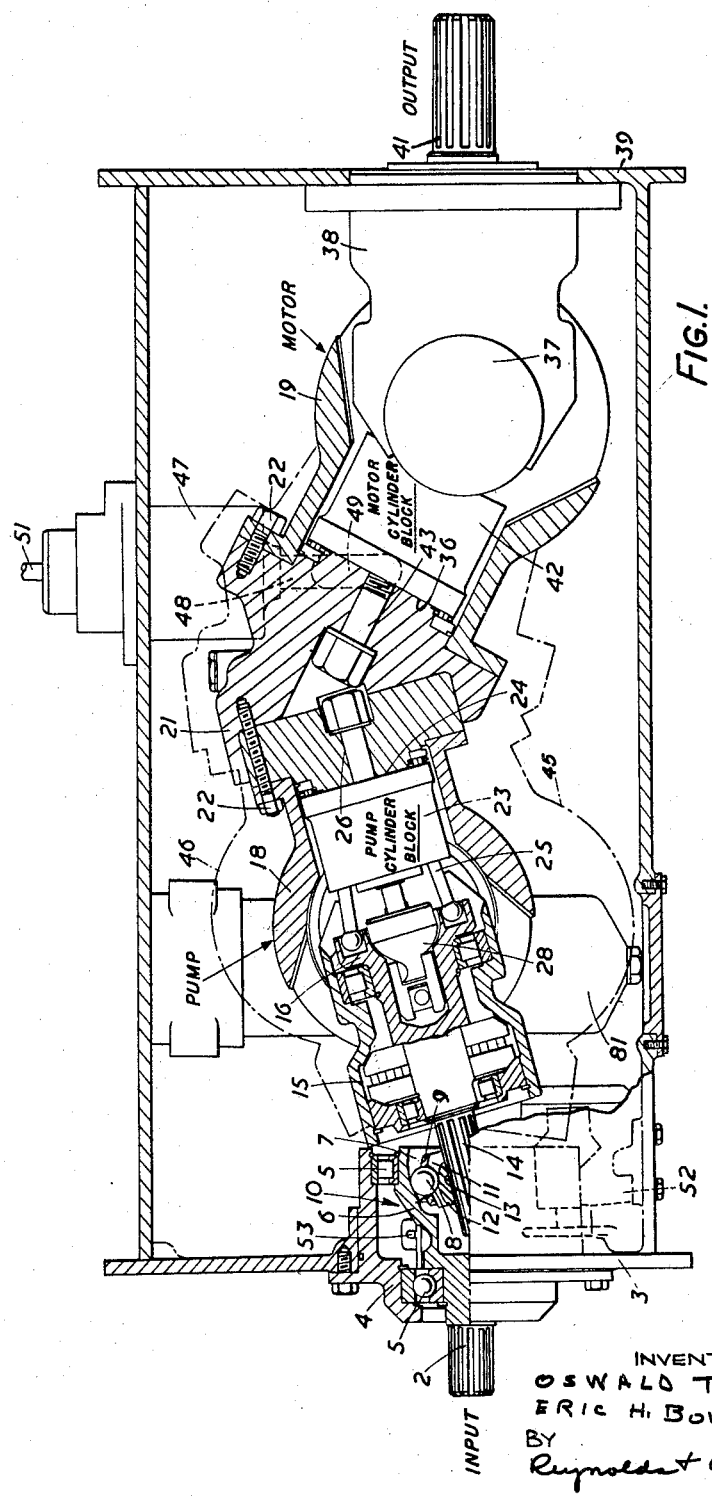
FIGURE 1 is an elevation of the transmission in part of cross-section.
Figure 2:
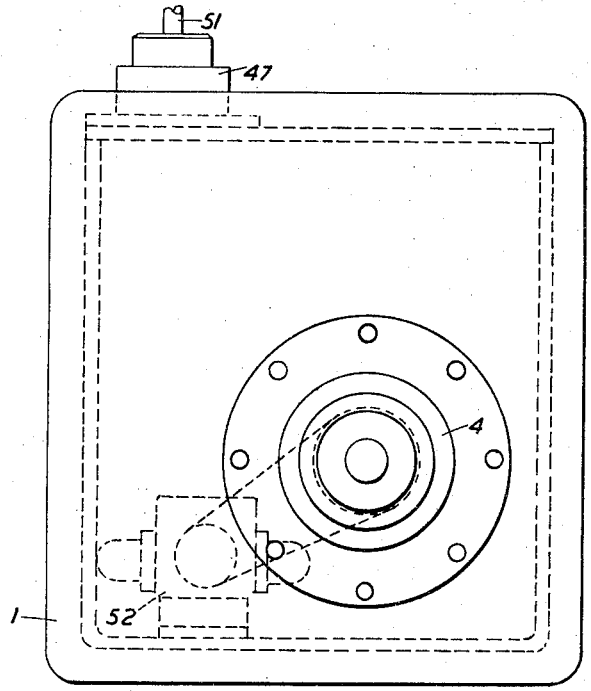
FIGURE 2 is an end elevation of the transmission of FIGURE 1.

Referring initially to FIGURES 1, 2 and 3 the reservoir 1 within which the transmission is mounted is of elongated shape and is adapted to form a part of a structural member of the vehicle on which the transmission is mounted. The shaft 2 at the left hand end of the reservoir is the input shaft of the transmission and is adapted for connection to the vehicle engine. Within the left hand wall 3 of the reservoir a bearing housing 4 is located carrying bearing 5 which locates the outer case 6 of the constant velocity universal joint 10. The case 6 and the shaft 2 are integrally formed. Within the case 6 a plurality of meridian grooves 7 are formed for co-operation with balls 8 carried within cage 9. The balls 8 in turn engage in meridian grooves 11 in the central member 12 of the constant velocity joint. Within the member 12 a splined hole 13 is formed for the reception of a splined drive shaft 14. The drive shaft extends into a bearing housing 15 of the pump and terminates in an integrally formed thrust plate 16.

The bearing housing 16 is carried by trunnion bearings 17 within the pump portion 18 of the cylinder block carrier, the trunnion bearings allowing pivotal movement of the bearing housing 15 about an axis perpendicular to the rotation axis of the drive shaft 14. The cylinder block carrier is formed by the pump portion 18, the motor portion 19 and the valve portion 21 and these members are bolted together by bolts 22 to form what is effectively an integral member. Within the pump portion 18 of the carrier the pump cylinder block 23 is mounted for rotary movement on a valve plate 24. The valve plate 24 forms a part of the valve portion 21. The internal structure of the cylinder block 23 is illustrated more particularly in FIGURE 5 of the drawings and will be described in detail later in this specification. The cylinder block 23 is rotated by means of constant velocity universal joint 28 acting between the thrust plate 16 and the cylinder block, the arrangement of this joint being substantially as disclosed in our co-pending application 818,291.

Within the valve plate 24 the cylinder block 23 co-operates with a pair of kidney shaped ports 29 and 31 and within the valve portion 21 these ports form the ends of the passages 32 and 33 extending through the valve portion 21. At the opposite end these passages terminate in kidney shaped ports 34 and 35 formed in the valve surface 36.

The motor portion 19 of the block carrier is carried by means of trunnion bearings 37 supported by a bearing housing 38 formed as part of the right hand wall 39 of the reservoir 1. The bearing housing 38 contains bearings for the output shaft 41, such bearings being fixed in position. Also in the housing 38 the shaft 41 terminates in a thrust plate from which connecting rods extend to pistons within cylinders formed in a motor cylinder block 42 mounted for rotation on the valve surface 36. The cylinder block 42 is driven by a constant velocity universal joint as disclosed in our said co-pending patent application 818,291. The internal structure of the cylinder block 42 is substantially the same as for the cylinder block 23 other than the fact that it is larger in size and this internal structure will be appreciated from the description relative to FIGURE 5 of the accompanying drawings. The cylinder block 42 is mounted for rotation by means of stem 43 and a passage 44 extends through the stem 43 for the supply of high pressure liquid to a balancing cylinder. The trunnion bearings 37 are arranged to be the pivots about which the block carrier may pivotally move and in such movement the thrust plate attached to the output shaft 41 is adjustably inclined relative to the motor cylinder block 42, thus to adjust displacement of the motor. In pivotal movement of the cylinder block carrier about the trunnion 37 it will be seen that bearing housing 15 and the drive shaft 14 will vary angularly about the trunnion bearing 17 by virture of the location of the drive shaft 14 within the central portion 12 of the constant velocity universal joint 10 which is formed by the parts 6, 7, 8, 9, 11 and 12. The space in between the joint 10 and the trunnion bearings 17 is arranged to be considerably shorter than the space between the trunnion bearings 17 and the trunnion bearings 37 so that for a given angular movement of the block carrier which adjusts the displacement of the motor by virtue of the angular movement of the motor cylinder block 42 relative to its thrust plate there is a considerably greater angular movement of pump thrust plate 16 relative to the pump cylinder block 23. Also the arrangement of the block carrier is such that the valve surfaces 24 and 36 are inclined to one another at an angle of about 45° to ensure that in the position of the pump as shown at zero displacement the motor has a displacement which corresponds to an inclination between cylinder block and thrust plate of 27°. Anti-clockwise movement of the block carrier as seen in FIGURE 1 to the lowermost limit of its movement as indicated by the dot and dash line 45 will cause a reduction of motor displacement to that corresponding to an angle of 16° between the motor cylinder block and its thrust plate, and an increase of pump displacement to that corresponding to an angle of 35° between thrust plate 16 and cylinder block 23. This corresponds to the maximum transmission speed ratio between the shafts 2 and 41 in the forward direction, i.e. the shaft 41 will rotate in the same direction as shaft 2. The motor cylinder block is preferably larger than the pump cylinder block so that at these two angles the displacements of pump and motor are equal and the output shaft will rotate at the same speed as the input shaft. Upward movement of the cylinder block carrier to the limit indicated by the dot and dash line 46 will cause increase in motor displacement corresponding to an angle of 35° between motor cylinder block and thrust plate, and a reverse displacement of the pump corresponding to an angle of 20° between the pump thrust plate and cylinder block. This will give reverse rotation of shaft 41 at a lower speed ratio than the maximum in the forward direction. Between these two extreme speed ratios, movement of the cylinder block carrier will give a smooth infinite variation of speed ratio between the shafts 2 and 41. For the purpose of adjusting the block carrier to any desired angular position about the trunnion 37, a servo motor 47 is located within the reservoir to one side of the block carrier. A piston rod 48 extends from servo motor 47 and is connected by a pivoted link 49 to the block carrier. The servo motor may be of any convenient kind operable by hydraulic pressure. A control member 51 extends from the servo motor, manual movement of this control then adjusting the transmission speed ratio. For the purpose of maintaining the transmission primed with hydraulic liquid, a small make-up pump 52 is located within the reservoir adjacent the bearing housing 4, this pump being chain driven from a sprocket 53 formed around the outside of the outer member 6 of the universal joint 10. Alternatively, the make-up pump may be driven by gear from member 6.

Figure 5:
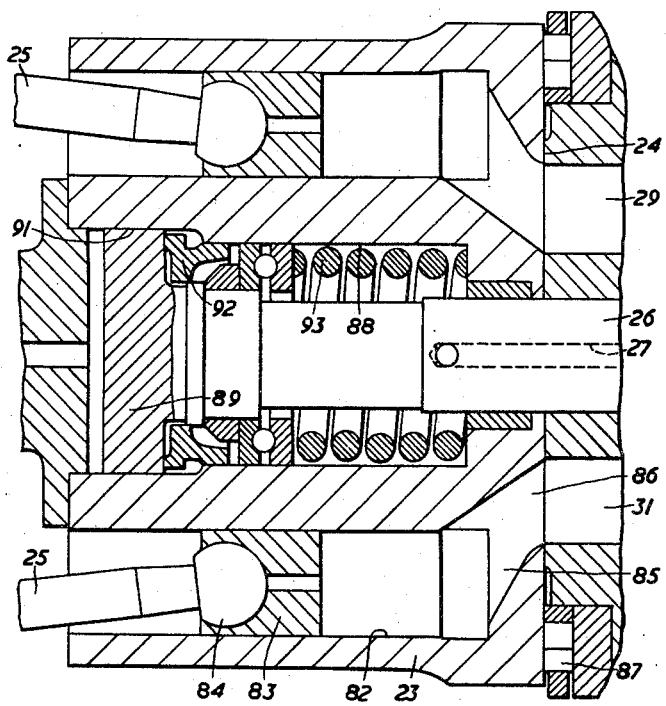
FIGURE 5 is a cross-section through a pump or motor cylinder block.

Reference is now made to FIGURE 5 for a description of the structure of the cylinder block 23. Within the cylinder block a plurality of cylinders 82 are formed being substantially parallel to the axis of block rotation and being equally spaced around this axis of rotation. Each cylinder 82 contains a piston 83 formed with a ball connection 84 from which a connecting rod 25 extends to the thrust plate 16. The cylinder 82 is open at the end facing the thrust plate 16 but at the opposite end it is connected by a passage 85 to a port 86 which is nearer to the axis of rotation than the cylinder 82. The ports 86 co-operate with the kidney shaped ports 29 and 31 during rotation of the cylinder block. The cylinder block is mounted for rotation on a stem 26 extending from the valve surface 24 and is supported on this valve surface by means of roller bearings 87. The stem 26 extends through a central cylinder 88 within the cylinder block and terminates in a head 89 in an enlargement 91 of the cylinder 88. A seal 92 acts between the cylinder 88 and the underside of the head 89 to prevent escape of high pressure liquid which enters the cylinder 88 through the passage 27 disposed centrally of the stem 26. A spring 93 within the cylinder 88 acts between the stem 26 and the cylinder block to provide initial engagement of the cylinder block against the valve surface 24. The action of high pressure within cylinder 88 will also act to urge the cylinder block against valve surface 24. The provision of the cylinder 88 is to ensure that at all times there is sufficient hydraulic force present to hold the cylinder block 23 on the valve surface 24 against the hydraulic force acting over the ports 29 and 31 which tends to lift the cylinder block from the valve surface 24. This tendency to lift is due entirely to the fact that ports 29 and 31 are of large size for high efficiency. The structure of the cylinder block 42 is substantially identical with that of the cylinder block 23 with the exception that it is proportionately larger.

Figure 4:
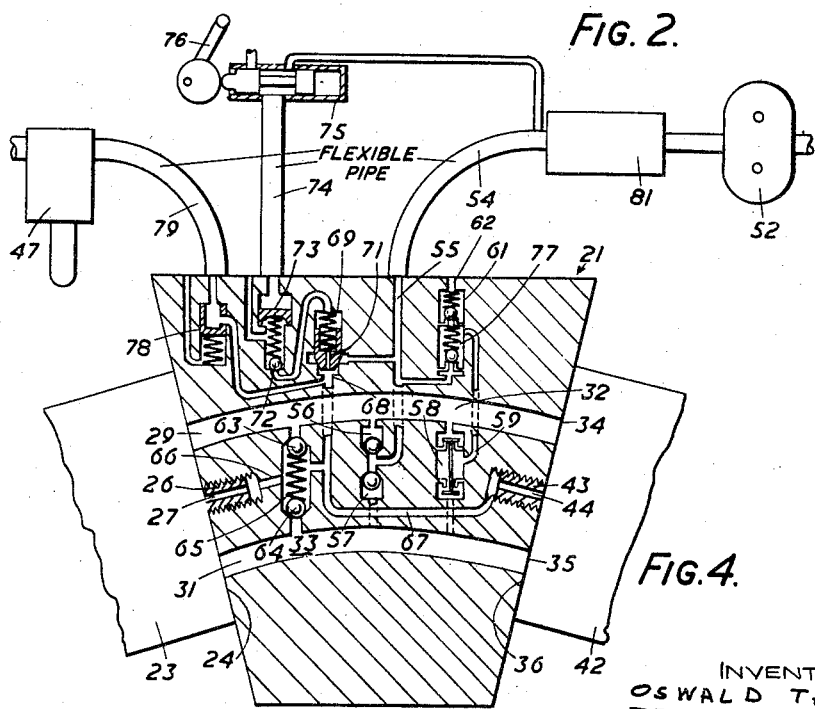
FIGURE 4 is a surface diagram showing the valves mounted within the transmission and the respective controls.

For successful operation of the transmission a number of valves are necessary and for the most part these valves are included within the valve portion 21 of the cylinder block carrier. Reference is here made to FIGURE 4 in which these valves are diagrammatically illustrated. Oil delivered by the make-up pump 52 enters the valve portion 21 by means of a flexible pipe 54 and passes directly through passage 55 to a pair of non-return valves 56 and 57 connected to the passages 32 and 33. The passage at higher pressure will maintain its associated non-return valves 56 or 57 closed which will enable the make-up pressure to pass through the other non-return valve in the passage at lower pressure. To ensure continuous change of oil within the transmission a shuttle valve 58 is connected to the two passages 32 and 33 whose function is to allow flow of oil from the passage at lower pressure into a pipe 59. Pipe 59 connects to a spring loaded non-return valve 61 and oil flowing through the pipe 59 reaches a pressure sufficient to open the non-return valve 61 and to flow from the passage 62 of valve portion 21 into the reservoir. The valve 61, therefore, performs a function of ensuring that the passage 32 or 33 at the lower pressure does not fall below a minimum pressure determined by the valve 61. For the purpose of supplying pressure from the passage 32 or 33 at higher pressure, a further pair of non-return valves 63 and 64 are provided which are connected to the passages 32 and 33 in the opposite manner to the valves 56 and 57. The higher pressure will then act to maintain the valve in connection with the lower pressure passage closed, the higher pressure leading into a central space 65. This central space 65 is connected by passages 66 and 67 with the central passages 27 and 24 extending through the stems 26 and 43 to supply the balancing cylinders in the cylinder blocks 23 and 42. A further passage 68 also extends from the space 65 to a pilot operated valve 69. Valve 69 is arranged to perform the functions either of high pressure relief or of unloading the transmission to render it inoperative. Construction of the valve 69 is quite conventional in that it includes a bleed passage 71 to allow the pressure as supplied to the passage 68 to act behind the valve member over a slightly greater area to hold it on its seat. The pressure behind the valve 71 may be vented by a spring loaded pilot valve 72, the spring of which is adjustably loaded by means of a small piston 73 movable between stops. A flexible pipe 74 extends from the valve portion 21 to an external valve 75 operation of which by the lever 76 acts to connect make-up pressure or reservoir pressure to the piston 73, thus to cause the spring loading of the valve 72 to be compressed or released. When the spring loading of valve 72 is compressed, the pressure behind the valve 69 can build up to a maximum safe value of the transmission at which value the pilot valve 72 will open to reduce pressure behind the valve 69, thus allowing it to open to pass liquid through the passage 65 and through one or other of the non-return valves 56 or 57 back into the transmission passages 32 or 33. In this way loss of liquid from the transmission is avoided and pressure is prevented from exceeding a maximum value. For unloading the transmission the valve 75 is operated to remove pressure from the piston 73 so the valve 72 becomes unloaded and pressure is vented from behind valve 69. In this way the liquid from the passage 32 or 33 at higher pressure will be freely connected to valve 69, passage 65 and non-return valve 56 or 57 to either of the passages 32 or 33. This will ensure that substantially no effective pressure may be developed in the transmission passages 32 or 33, thus preventing transmission of power through the transmission. A spring loaded non-return valve 77 is provided in series with the non-return valve 61 to ensure that the make-up pressure as delivered by the pump 52 is at a predetermined pressure higher than the pressure demanded by the non-return valve 61.

For the purpose of operating the servo motor 47, a constant pressure reducing valve 78 is provided to receive liquid from the high pressure passage 68 and to reduce it to a constant pressure for delivery through a flexible pipe 79 extending from the valve portion 21 of the servo motor 47. When the transmission pump is at zero displacement and there is no pressure differential between the passages 32 and 33 it will be seen that the make-up pressure carried through the passage 54 will be fed through the passage 58 to the valve 78 and thus through the pipe 79 to the servo motor 47. Thus it will be seen that the whole transmission may be adequately controlled by the use of only three flexible pipes 54, 74 and 79 in connection with the valve portion 21 of the cylinder block carrier. If the vehicle on which the transmission is mounted is a tractor, it will be seen that the transmission will give a range of speed ratios between maximum forward speed and a somewhat lower reverse speed, between these two limits the speed ratio being infinitely variable. Where a power take-off is desirable from the engine it is possible to connect such a power take-off by a suitable gearing from the shaft 2 of the transmission and with the transmission arranged to give a zero speed ratio, i.e. with the pump at zero displacement, the power may be taken from the engine without the vehicle being propelled. Under such circumstances the valve 75 would be operated to cause valve 69 to unload the transmission to prevent any possible movement of the transmission motor.

An oil filter 81 may be located within the reservoir to be connected so that all oil delivered by the make-up pump 52 will pass through it before delivery to valve portion 21 of the transmission.

Whilst the universal joint combination has been shown in the example as comprising a constant velocity universal joint in combination with a splined shaft any other mechanical arrangement giving the same effect could be used. For example, the pump drive shaft 14 may carry a bevel gear engaging with a driven bevel gear rotating about an axis at right angles thereto, a pivoted bearing shaft 14 locating its pivotal motion about the axis of the driven bevel gear so that the two bevel gears are constantly in mesh. A splined connection or equivalent is provided in the shaft 14 to accommodate variations in length during pivotal movement of the block carrier.

We claim as our invention:

1. A transmission comprising a pump rotary cylinder block having a plurality of cylinders approximately parallel to its rotation axis, a motor rotary cylinder block having a plurality of cylinders approximately parallel to its rotation axis, a block carrier, pump and motor valves carried by said block carrier on which said pump and motor cylinder blocks are respectively mounted for rotation, a rotary pump thrust plate, a rotary pump drive shaft fixedly secured to the pump thrust plate, a pump bearing housing mounting said pump drive shaft and thrust plate for rotation, a pump pivotal connection between the pump bearing housing and the block carrier supporting the pump thrust plate for pivotal movement about an axis transverse to the rotation axis of said pump thrust plate and pump cylinder block, pump pistons in the pump cylinders connected to the pump thrust plate for reciprocation, a pump rotary drive means interconnecting said pump thrust plate and cylinder block for similar rotation about their respective axes, a rotary motor thrust plate, a rotary motor drive shaft securely fixed to the motor thrust plate, a motor bearing housing mounting said motor drive shaft and thrust plate for rotation, a motor pivotal connection between the motor bearing housing and the block carrier supporting the motor thrust plate for pivotal movement about an axis transverse to the rotation axes of said motor thrust plate and motor cylinder block, motor pistons in the motor cylinders connected to the motor thrust plate for reciprocation, a motor rotary drive means interconnecting said motor thrust plate and motor cylinder block for similar rotation about their respective axes, hydraulic passages in the block carrier interconnecting the pump and motor valves, and means for adjustable movement of the block carrier to cause simultaneous adjustment of the inclination between the pump thrust plate and cylinder block rotation axes and the inclination between motor thrust plate and cylinder block rotation axes.

2. A transmission as claimed in claim 1 wherein the block carrier is mounted for pivotal movement to cause simultaneous and opposite adjustments of the inclination between the pump thrust plate and cylinder block rotation axes and the inclination between the motor thrust plate and cylinder block rotation axes.

3. A transmission as claimed in claim 2 including a pivotal bearing for the block carrier co-axial with a pivotal connection between a thrust plate bearing housing and the block carrier.

4. A transmission as claimed in claim 3 wherein the bearing housing, about which pivotal movement of the block carrier takes place, is fixedly mounted.

5. A transmission as claimed in claim 4 including a third bearing housing fixedly mounted in position, a third drive shaft carried in said third bearing housing and universal joint means interconnecting the third drive shaft with the drive shaft carried by the other of said bearing housings pivotally mounted in the block carrier.

6. A transmission as claimed in claim 5 wherein the motor bearing housing is fixed and the block carrier is mounted for pivotal movement about the motor bearing housing.

7. A transmission as claimed in claim 5 wherein the spacing between said universal joint means and the pivotal connection of the said other bearing housing to the block carrier is smaller than the spacing between the pivotal connections of the bearing housings to the block carrier whereby pivotal movement of the block carrier will cause opposite and different variations of the inclination between the pump thrust plate and cylinder block rotation axes and the inclination between the motor thrust plate and cylinder block rotation axes.

8. A transmission as claimed in claim 7 in which the said third shaft and the drive shaft mounted within the fixed bearing housing to which the block carrier is pivotally connected are substantially parallel one to the other and in which the cylinder blocks are mounted on the block carrier for rotation about axes inclined to one another.

9. A transmission as claimed in claim 1 including a reservoir for hydraulic liquid within which are mounted the block carrier, pump and motor cylinder blocks, pump and motor thrust plates, and pump and motor bearing housings.

10. A transmission as claimed in claim 9 for use in the transmission of power from a vehicle engine wherein the reservoir forms a structural member of the vehicle.

11. A transmission as claimed in claim 9 including a make-up pump mounted within the reservoir and a rotary drive connection to said make-up pump from a drive shaft of the transmission.

12. A transmission as claimed in claim 9 wherein the reservoir includes a servo motor connected to effect pivotal movement of the block carrier.

13. A transmission as claimed in claim 1 including transmission priming valves carried by the block carrier for cooperation with the said hydraulic passages.

14. A transmission as claimed in claim 1 including an unloading valve carried by the block carrier for co-operation with the said hydraulic passages.

15. A transmission as claimed in claim 1 including a make-up pump for supplying hydraulic liquid to the transmission and a shuttle valve mounted within the block carrier for co-operation with the said hydraulic passages within the carrier to supply hydraulic liquid from the said make-up pump to the passage at lower pressure.

No references cited.